United States Patent
Pearce et al.

[15] 3,686,536
[45] Aug. 22, 1972

[54] CAPACITOR HAVING A SEALING MEANS ENGAGING THE TERMINALS

[72] Inventors: Godfrey R. Pearce, Route #2; William J. Breeden, 101 St. Charles Court, both of Glasgow, Ky. 42141

[22] Filed: Sept. 13, 1971

[21] Appl. No.: 179,750

[52] U.S. Cl..................................317/230, 317/242
[51] Int. Cl..............................................H01g 9/10
[58] Field of Search...............317/230, 232, 231, 233

[56] References Cited

UNITED STATES PATENTS 3,015,759 1/1962 Bugel et al.................317/230
3,346,781 10/1967 Marisi, Jr. et al..........317/230
3,551,756 12/1970 Frekko......................317/230
3,555,370 1/1971 Bawling.....................317/230

*Primary Examiner*—James D. Kallam
*Attorney*—Richard H. Childress et al.

[57] ABSTRACT

Projections are provided on capacitor tabs to provide spacing between the capacitor body and seal member for gas expansion, thus eliminating the spacing plug commonly used.

10 Claims, 4 Drawing Figures

Patented Aug. 22, 1972

3,686,536

INVENTORS
WILLIAM J. BREEDEN
GODFREY R. PEARCE
BY
Henry W. Cummings
ATTORNEY

CAPACITOR HAVING A SEALING MEANS ENGAGING THE TERMINALS

BACKGROUND

It has previously been the practice in the assembly of electrical capacitors to provide spacers between the capacitor body and the seal. These spacers act to hold the capacitor body against the bottom of the can and provide some expansion space for gases which may result from chemical reactions which occur during operation of the device. The gases are gradually exhausted from the device through the seal material.

Additionaly the space provides improved electrical properties in the seal region resulting from the removal of the "wet" capacitor cartridge from the inside face of the capacitor end-seal.

In practice electrolyte from the capacitor cartridge will become absorbed into the end seal, unless a gap or space is provided. Hence the gap will additionaly provide quality advantages.

Costly gauging operations are often used (instead of spacing plugs) to provide a gap.

However, in the present competative market situation, it is desired to reduce the material and assembly cost of electrical capacitors as much as possible. The use of spacing plugs and/or gauging operations are significant outlays in the cost of capacitor production.

It therefore is the object of the present invention to provide a means of supporting the capacitor seal against the top portion of the can and at the same time urge the capacitor body against the bottom of the can.

It is another object of the invention to provide gas expansion space while at the same time reduce the cost of the material and assembly.

Other objects will be apparent from the following description and drawings.

DRAWINGS

DESCRIPTION

Figure 1:
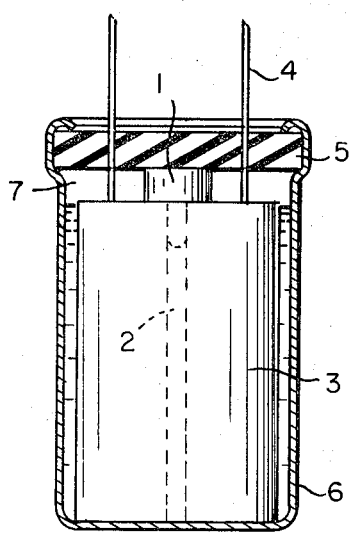
FIG. 1 is a sectional view of a capacitor produced according to the prior art.

As can be seen in FIG. 1, capacitors produced according to the prior art technique utilized a plug 1, the tip of which inserted into an opening 2 in the capacitor cartridge or body 3. Capacitor tabs 4, were then attached to the electrodes of the device and passed through a seal member 5. The plug 1 was utilized to keep the capacitor body in firm engagement with the capacitor can 6, and provide space 7 for expansion of gases during the operation of the device.

However, as mentioned before, the material cost for the plug 1, results in significant cost outlay in the production of electrolytic capacitors.

Figure 3:
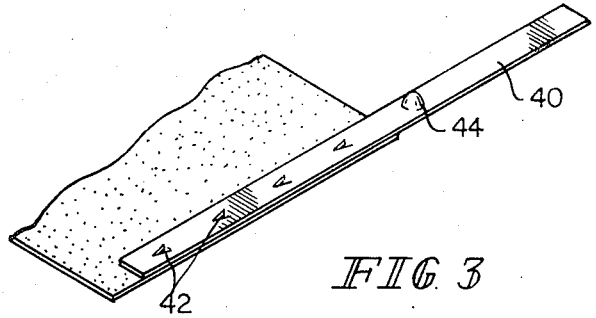
FIG. 3 is a detailed view of the tab construction according to the present invention.
Figure 2:
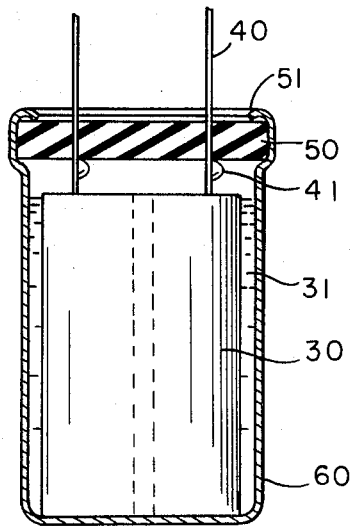
FIG. 2 is a view of a capacitor produced in accordance with the present invention.

Therefore, in accordance with the present invention, as can be see in FIG. 2, the capacitor tabs 40, are provided with extensions 41, which are at least partically parallel to seal member 50 and provide support for seal 50. These extensions may for example, comprise dimples, as shown in FIG. 3. The dimples may be easily stamped out of the metal tab material which is preferably film forming metal and most preferably aluminum. The cost of the stamping operation is very small.

Figure 4:
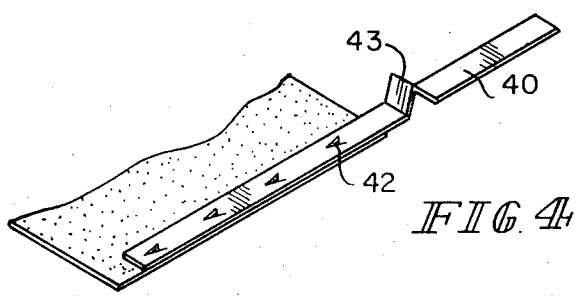
FIG. 4 is a detail view of another embodiment of the present invention.

An alternative type of extension is folds or bends 43 in tabs 40 as shown in FIG. 4. The fold or bend 43 can be formed by stamping, bending or other mechanical operations.

It will be apparent to those skilled in the art that the dimples and folds are only examples of various types of extensions which can be designed to cooperate with tabs 40 to perform the functions indicated.

It will be apparent that the extensions 41 perform the same function as does the plug in the prior art device. The extensions urge seal member 50, into engagement with the upper portion of can 60, including crimp 51, and at the same time act to urge the cartridge or capacitor body 30, downwardly and in engagement with the bottom of can 60.

The extensions 41 further provide spacing between the cartridge and seal member 50, so that gases resulting from chemical action within the device can have an expansion space to avoid the device exploding. If desired an escape device in seal member 50 may be provided to vent the device if the pressure generated within the device reaches a certain level.

The use of crimps 51 is by way of example only. It will be apparent to the skilled in the art that other means such as flanges or shoulders could be used in cooperation with the upper portion of the can and the tab extensions to hold the seal member(s) in place.

The electrodes may be connected to the tabs in any of the known manner. For example, the electrode sheets may be lanced into engagement with the tabs as indicated at 42 in FIGS. 3 and 4.

The cartridge 30 may be a conventional wound type cartridge with spacers interposed between wound sheets and impragnated with an electrolyte as indicated at 31. The separators may be made of any of the known materials for this purpose including paper, fiber, plastic or combinations thereof. The electrolyte may be any of the known organic or inorganic types. By way of example only, organic types include ethylene-glychol, dimethel formamide; inorganic electrolytes include sulfuric acid, phosphoric acids and salts thereof, but it is emphasized that any of the known capacitor electrolytes may be used.

While the electrodes may be made of any of the conductive metals such as copper, silver, gold film forming metals are prefered and including tantalum, niobium and aluminum and the most prefered metal is aluminum.

The can may be made of plastic or metal. Preferably it is made of metal such as steel, copper, or aluminum.

The seal 50 may be formed in one or more layers and usually one at least one layer is a polymeric material such as an olefin polymer, for example polyethylene, polypropylene, polystyrene or copolymers thereof.

It is to be understood that the invention is not limited to the particular electrolytes, electrode metals, seal material or seal constructions exemplified above.

What is claimed is:

1. A capacitor comprising:
   a metal or plastic container having an open end;

a wound capacitor body including at least two metal electrodes;

at least two tab members in electrical engagement respectively with said electrodes;

a seal member in said open end for closing said container;

said tab members passing through said seal member and being electrically insulated from each other.

said tab members having means thereon spaced from the top of said capacitor body for urging said seal member into engagement with at least a portion of said container adjacent the open end thereof; and a gas expansion space being defined by the top of said capacitor body and the bottom of said seal member.

2. A capacitor according to claim 1 wherein the means for urging on said tab member is an extension at least particially parallel to said seal member.

3. A capacitor according to claim 2 wherein said extension comprises a dimple.

4. A capacitor according to claim 2 wherein said extension comprises a bend.

5. A capacitor according to claim 2 wherein at least one seaparator is provided between said metal electrodes.

6. A capacitor according to claim 2 wherein said separator is impregnated with a liquid electrolyte.

7. A capacitor according to claim 2 wherein said electrodes are made of film forming metal.

8. A capacitor according to claim 2 wherein said electrode metal is aluminum.

9. A capacitor according to claim 2 wherein said seal member is made in a plurality of layers.

10. A capacitor according to claim 9 wherein at least one of said layers in said seal member is made of polymeric material.

* * * * *